United States Patent [19]

Boybay et al.

[11] 4,362,703

[45] Dec. 7, 1982

[54] PROCESS FOR PREPARING CRYOLITE FROM FLY ASH

[75] Inventors: Mustafa Boybay; Turgut Demirel, both of Ames, Iowa

[73] Assignee: Iowa State University Research Foundation, Inc., Ames, Iowa

[21] Appl. No.: 353,066

[22] Filed: Mar. 1, 1982

[51] Int. Cl.³ .............................................. C01F 7/54
[52] U.S. Cl. .................................. 423/116; 423/111; 423/126; 423/119; 423/132
[58] Field of Search ............... 423/111, 116, 119, 126, 423/132

[56] References Cited

U.S. PATENT DOCUMENTS

| | | | |
|---|---|---|---|
| 2,567,544 | 9/1953 | Brodal et al. | 423/131 |
| 2,916,352 | 12/1959 | Fitch et al. | 423/116 |
| 2,991,159 | 7/1961 | Wendt | 423/131 |
| 3,666,406 | 5/1972 | Kitano | 423/116 |
| 4,069,296 | 1/1978 | Huang | 423/132 |

OTHER PUBLICATIONS

Chomiakow et al., "Chemical Absts.", vol. 92, 1960, #179988c, p. 555.

*Primary Examiner*—Herbert T. Carter

[57] ABSTRACT

Cryolite ($Na_3AlF_6$) as a source of aluminum is prepared from coal fly ash by reacting the aluminum oxide ($Al_2O_3$) in fly ash with phosphoric acid to form aluminum phosphate, which is then converted to sodium aluminate by reaction with sodium hydroxide, and the sodium aluminate is converted to cryolite by reaction with hydrofluoric acid (HF), or equivalent reagent providing $H^+$ and $F^-$ ions. Aluminum is thereby obtained from fly ash in a preferred form (as cryolite) for use in producing metallic aluminum.

10 Claims, No Drawings

PROCESS FOR PREPARING CRYOLITE FROM FLY ASH

BACKGROUND AND PRIOR ART

Coal fly ash is produced as a by-product in the burning of pulverized coal. It is recovered from the flue gases. Fly ash is therefore a low cost material which is available in large quantity, but relatively few large scale commercial uses have been developed. With the increasing burning of coal to produce electrical energy, the amount of available fly ash can be expected to continually increase, and therefore processes using fly ash as a starting material will be increasingly important. The principal constituents of fly ash are the oxides of aluminum, iron, calcium, and silicon ($Al_2O_3$, $Fe_2O_3$, $CaO$, and $SiO_2$).

The relative proportions of the metal oxides in fly ash vary with the type of coal being burned. In general, however, coal fly ash as produced will contain 15% or more by weight of aluminum oxide, and some fly ashes will contain as much as 28% $Al_2O_3$. For example, in the United States, the burning of bituminous coal produces a fly ash having an average aluminum oxide content of about 22%, the range being from about 16 to 27% $Al_2O_3$. The iron oxide content is usually much higher in bituminous coal fly ashes than with fly ashes produced from other types of coal, such as subbituminous lignite. Bituminous coal fly ashes may contain from 12 to 22% $Fe_2O_3$. However, the iron rich particles of the fly ash can be separated to enrich the aluminum oxide content, such as by magnetic separation. Upgraded fly ash produced by initial removal of the iron oxide may contain as much as 18 to 21% $Al_2O_3$.

It is known that fly ash can be leached with strong mineral acids to solubilize the aluminum, such as by leaching the fly ash with sulfuric acid. It is also known that fly ash can be reacted with phosphoric acid to convert at least part of the aluminum oxide to aluminum phosphate. A process has been proposed using this reaction as the first step in producing $Al_2O_3$ or $Al(OH)_3$ and dibasic ammonium phosphate. *Chem. Abst.*, 92, page 555: 179988c (1980).

Most of the recent research and development work on producing aluminum from fly ash has centered on the extraction of alumina by a lime-soda sinter process. After removal of the iron-rich magnetic fraction of the fly ash by magnetic separation, the upgraded fly ash is sintered with lime (or calcium carbonate), and soda ash. For efficient use on a production basis, this process may require the milling of the fly ash in admixture with the calcium carbonate and sodium carbonate, and then pelletizing or nodulizing of the ground mix prior to treatment in the sintering furnace at high temperatures. Following the sintering, cooling and further grinding are required prior to the leaching with a sodium carbonate solution, and additional filtration and precipitation steps are required to recover the solubilized alumina. Therefore, a need has been recognized for an alternative process for recovering aluminum from fly ash, but, as far as is known, it has not been suggested that the alumina might be recovered in the form of cryolite rather than as alumina ($Al_2O_3$).

SUMMARY OF INVENTION

Cryolite is prepared from a coal fly ash containing aluminum oxide as one of the principal constituents by first reacting the fly ash with aqueous phosphoric acid to convert a substantial portion of the aluminum of the fly ash to aluminum phosphate. This produces a first reaction mixture containing a substantial amount of aluminum phosphate. To this mixture there is added aqueous sodium hydroxide, which is reacted therewith to form a second reaction mixture. The amount of sodium hydroxide added is sufficient to convert the aluminum phosphate to sodium aluminate. The undissolved solids are separated from the second reaction mixture to obtain a solution containing the sodium aluminate. To this solution there is added aqueous hydrofluoric acid (or equivalent), which is reacted therewith to form cryolite as a precipitate at an alkaline pH. The precipitated cryolite is separated from the residual solution. The preferred operating conditions for these process steps, and additional steps which may be employed, are described below.

DESCRIPTION OF PREFERRED EMBODIMENTS

The process of the present invention is applicable to any coal fly ash containing aluminum oxide (alumina, $Al_2O_3$) as one of the principal constituents. Preferably, however, the fly ash starting material contains at least 12% alumina by weight. In embodiments where the fly ash is first processed to remove an iron-rich magnetic fraction, such as by a magnetic separation procedure, the fly ash material for treatment with $H_3PO_4$ will desirably contain at least 15% $Al_2O_3$. The fly ash may be used in the particulate form obtained by the burning of the coal, and does not need to be further ground prior to use in the process of the present invention. In general, the fly ash starting material will contain from about 12 to 27% alumina together with substantial amounts of iron oxide ($Fe_2O_3$) calcium oxide ($CaO$), and silicon dioxide ($SiO_2$).

In the first step of the chemical reaction sequence of the present invention, the fly ash starting material is reacted with aqueous phosphoric acid ($H_3PO_4$). Preferably, the phosphoric acid is used in a concentrated form, such as aqueous phosphoric acid containing at least 40% $H_3PO_4$ by weight. In a desirable embodiment, the aqueous phosphoric acid contains 30% or less water by weight, such as 70 to 90% $H_3PO_4$.

The amount of the phosphoric acid reactant employed should be sufficient to convert a substantial portion of the aluminum (as alumina) of the fly ash to aluminum phosphate ($Al_3PO_4$). In a desirable embodiment, the amount of phosphoric acid to be employed with a particular fly ash is calculated on the basis of acidification value for fly ash. More specifically, the acidification value is calculated for the particular fly ash, which value is referred to herein as the Fly Ash Acidification Mole or FAA Mole. The FFA Mole is computed as two (2) times the total moles of $Al_2O_3$ and $Fe_2O_3$ in the amount of fly ash used plus ⅔ (0.67) times the moles of $CaO$ therein. Using this calculated value, fly ash may be treated with a molar amount of $H_3PO_4$ equal to 0.6 to 2.0 times the Fly Ash Acidification Mole.

The reaction of the fly ash with the phosphoric acid can be carried out under relatively mild conditions, such as 20° to 40° C. at atmospheric pressure. More broadly, the reaction may be carried out under atmospheric pressure and at temperatures ranging from about 15° to 100° C. By carrying out the reaction, the particulate fly ash may be mixed as a solid phase with the liquid phosphoric acid, suitable mixing equipment being employed. Where highly concentrated phosphoric acid is employed, as preferred, such as phosphoric acid having a concentration of 70% $H_3PO_4$ or greater, the initial reaction slurry, will become thicker and will tend to form aggregates or lumps, as the reaction proceeds. Therefore in the latter stages of the reaction, it will be desirable to employ solid phase-type mixing apparatus, such as apparatus preforming both mixing and grinding, to prevent the reaction mixture from setting up to a solid cake. This may also be prevented by having more water present in the reaction slurry, such as by using more dilute phosphoric acid. However, since additional water is added in the next step of the process, it is believed desirable to minimize the amount of water present in the first step, although this is not essential for the desired conversion of the alumina to aluminum phosphate. The reaction time will depend on the temperature employed, but usually, the reaction will be sufficiently completed in about 1 to 3 days at ambient temperatures (15°–25° C.). By heating the reactants, the reaction time can be shortened to 1 to 3 hours. Upon the completion of the first reaction, as described above, and depending on the amount of water present, part of the converted aluminum phosphate may be in solution and part as a solid phase. However, in the first step of the process, it is not essential to obtain all of the aluminum phosphate in solution, and, in fact, as explained above, it is believed desirable to minimize the amount of water present, which will result in a substantial part of the aluminum phosphate being present as a solid in the first reaction mixture.

In order to assure that all of the aluminum phosphate formed in the first step is available for reaction in the second step, it is preferred not to separate solids from the reaction solution before carrying out the second step of the reaction. Therefore, in a preferred embodiment, the entire reaction mixture from the first step, which may be in the form of a slurry or a ground paste, is then reacted with aqueous sodium hydroxide (NaOH). Where the water present in the first step has been kept to a minimum and the reaction mixture obtained is in the form of a paste, most of the aluminum phosphate will be present in the solid phase, and the second step reaction will proceed on the basis of a colloidal system. The concentration of the added sodium hydroxide is not critical, but for convenience and to assure completeness of the reaction, it is desirable to employ aqueous sodium hydroxide having a concentration of from about 10 to 30% NaOH, such as 15 to 25% concentration. The amount of sodium hydroxide employed should be sufficient to convert all of the aluminum phosphate to sodium aluminate ($Na_3AlO_3$), and also, to convert the iron oxide present to ferric hydroxide, $Fe(OH)_3$. For example, from about 6 to 10 moles of NaOH may be employed per the combined moles of aluminum and iron in the starting fly ash. Usually, however, it will be advantageous to employ an excess of the sodium hydroxide reactant, viz. 9 moles NaOH or more on the same basis. The excess sodium hydroxide is preferably sufficient to produce a second reaction mixture having a pH of above 12.0, such as a pH from 12.5 to 13.5.

The sodium hydroxide reaction may be carried out in a mixer-reactor, under mild reaction conditions, such as a temperature from about 20° to 60° C. and at atmospheric pressure. The required reaction time under these temperature conditions will range from about 1 to 4 hours. If desired, the reaction may be accelerated by heating the reactants, such as to a temperature of about 60° to 80° C., and with such heating, the reaction time may be shortened to about 0.5 hours.

The second reaction of the process takes advantage of the fact that aluminum hydroxide, $Al(OH)_3$ is an amphoteric compound. In the presence of strong acids such as HCl it behaves as a base, producing, for example, $AlCl_3$ in water. However, in the presence of an alkali such as NaOH, aluminum hydroxide behaves as an acid (i.e. $H_3AlO_3$) to produce sodium aluminate ($Na_3AlO_3$). The sodium aluminate is soluble in the water and therefore forms part of the liquid phase of the second reaction mixture. Some of the components of the fly ash will remain insoluble and will form part of the solid residue. This will include the silicon dioxide ($SiO_2$) and the iron, which will be largely converted to a precipitate of iron hydroxide, $Fe(OH)_3$. Prior to the next step of the process, the solid residue is separated from the reaction solution which contains the sodium aluminate, by suitable separation procedure, such as filtration or centrifugation.

The solution for the third step of the process will contain the aluminum in the form of aluminate ions. Desirably, the pH of the solution is above 12.0, such as a pH from about 12.5 to 13.5. In the next step of the process, aqueous hydrofluoric acid (HF) is gradually added to the reaction mixture to form cryolite ($Na_3AlF_6$) at an alkaline pH. The reaction is exothermic, and will therefore proceed rapidly. Preferably, the temperature of the reaction mixture is maintained at about 40° to 60° C. Preferably, the hydrofluoric acid employed has a concentration of about 25 to 50% HF.

Instead of hydrofluoric acid, which is a relatively expensive reagent, the required $H^+$ and $F^-$ ions, as provided by HF, can be added to the reaction mixture in the form of an acid plus a water-soluble fluoride salt. For example, a strong mineral acid can be used as the $H^+$ source (HCl, $H_2SO_4$, $HNO_3$). Since chloride salt formed by addition of HCl have good solubility this mineral acid is preferred. The fluoride salt may be a water-soluble alkali metal or an alkaline earth metal fluoride. Sodium fluoride (NaF) is particularly desirable since it does not form precipitates, and is an available low cost reagent.

Calcium fluoride ($CaF_2$) is also an available low cost reagent, but the Ca compounds may precipitate requiring removal. In general, however, acids and fluoride salts are equivalent reagents to HF as source of the $H^+$ and $F^-$ ions for the desired reaction.

In order to obtain the cryolite in a more purified form, the hydrofluoric acid or equivalent reagent may initially be added to produce a precipitate substantially free from cryolite, such as precipitate composed of NaF, NaCl, and other compounds. This step, however, is optional. When a preliminary separation step is employed, the pH of the solution may be maintained above 11.0, while the hydrofluoric acid or equivalent reagent is being added to form the precipitate substantially free of cryolite. This precipitate may then be separated from the solution by a suitable separation procedure such as filtration or centrifugation. At that stage, the aluminate ions largely have been converted to aluminum ions. With the continued addition of the hydrofluoric acid, pH of the solution will be reduced below 11.0, such as to a pH above 10.0 but below 11.0. This will result in the formation of a cryolite-containing precipitate, which may also contain other compounds such as NaF. That precipitate may then be separated from the residual solution by filtration or centrifugation. The first cryolite product thus obtained, may be purified by boiling in water, thereby solubilizing the sodium fluoride, while leaving the cryolite as a precipitate.

Either with or without the preliminary separation step described above, the process proceeds by the addition of the hydrofluoric acid or equivalent reactant until a pH below 9.0, such as 7.0 to 8.5 is obtained, thereby forming a cryolite-containing precipitate. This cryolite product may be further purified, as described above with respect to the optional first cryolite product, by boiling it in water to solubilize components such as the sodium fluoride, thereby obtaining relatively pure cryolite.

During the addition of the HF, it can be observed that there is a rather sharp break in the pH at around 11.0, and that as the pH moves down below 11.0, the cryolite precipitate first forms. The sequential addition of the HF and the removal of the precipitate of cryolite may be repeated several times in the alkaline pH range below 11.0 down to about 7.0. The final pH should at least be below 9.0 and preferably below 8.5, such as around 7.0. Substantially all of the aluminate ions will be converted to the hexafluroaluminate ions at the time the solution reaches pH 7.0 to 7.2, and thereby at that pH substantially all of the cryolite will have precipitated. During the sequence of additions of the hydrofluoric acid, the concentration of HF used and the temperature conditions may be as described in connection with the first addition.

The residual solution at around pH 7.0 to 7.2, will contain silicon, fluoride, and sodium ions. The addition of further HF, will form a precipitate of sodium hexafluorosilicate ($Na_2SiF_6$) rather than additional cryolite. If desired, the sodium hexafluorosilicate may be recovered as an additional by-product.

The process of this invention is further illustrated by the following detailed examples.

EXAMPLE I 46.5 Grams of fly ash composed of 21.6% $Al_2O_3$, 24.5% $Fe_2O_3$, 45.3% $SiO_2$, 1.84% CaO, and 0.82% MgO was mixed with 53.5 grams of 85% $H_3PO_4$ (corresponding to FAA Mole) in a mechanical laboratory mixer for 6 minutes. The mixture was then kept at 100° C. for 18 hours. After this curing period the mixture was placed into the mechanical mixer and mixed with 2500 grams of 25% NaOH solution for one hour while keeping at 100° C. Then the mixture was filtered. The filtrate was then mixed with 50% aqueous HF acid, added gradually, to bring its pH to about 7, to precipitate the cryolite. The precipitate formed was recovered by filtration. The filtered cryolite was then mixed with boiling water, boiled for 15 minutes then filtered, the residue thus obtained after drying at 100° C. weighed 26 grams. X-ray diffraction analysis of the residue showed that it consisted of pure cryolite. Recovery of aluminum from the fly ash was 63% (as cryolite).

EXAMPLE II 46.5 Grams of fly ash and 53.5 grams $H_3PO_4$ (85%) mixture was prepared as described in Example I. Ten grams of this mixture was mixed with 500 grams of 25% NaOH solution for one hour at 100° C. in a mechanical mixer. The mixture was then filtered and washed to bring the filtrate volume to 800 cc. Two hundred cubic centimeters of the filtrate was mixed with 100 cc of 5% NaF solution. 18% HCl solution was gradually added to the mixture to bring its pH to a final pH of 7.

Precipitate formed at pH 9 to 7 was filtered. The precipitate was mixed with water and boiled for 15 minutes and filtered again. The residue thus obtained was dried at 100° C. After drying it weighed 0.6 gram. X-ray diffraction analysis showed it consisted of pure cryolite. Recovery of aluminum from fly ash was 58% (as cryolite).

We claim:

1. The process of preparing cryolite ($Na_3AlF_6$) from a coal fly ash containing aluminum oxide as one of the principal constitutents, comprising:

(a) reacting aqueous phosphoric acid ($H_3PO_4$) with said fly ash to convert a substantial portion of the aluminum of said fly ash to aluminum phosphate ($AlPO_4$), thereby obtaining a first reaction mixture containing a substantial amount of $AlPO_4$;

(b) adding aqueous sodium hydroxide (NaOH) to said first reaction mixture and reacting said NaOH therewith to form a second reaction mixture, the amount of NaOH added being sufficient to convert said $AlPO_4$ to sodium aluminate ($Na_3AlO_3$);

(c) separating the undissolved solids from said second reaction mixture to obtain a solution containing said $Na_3AlO_3$;

(d) adding hydrogen ions ($H^+$) and fluoride ions ($F^-$) to said $Na_3AlO_3$ contaning solution to form cryolite as a precipitate, said addition being continued to a final pH below 9.0; and (e) separating the precipitated cryolite from the residual solution.

2. The process of claim 1 in which said hydrogen and fluoride ions are added as aqueous hydrofluoric acid (HF).

3. The process of claim 1 in which said hydrogen and fluoride ions are added as aqueous hydrochloric acid (HCl) and sodium fluoride (NaF).

4. The process of claims 1, 2, or 3 in which step (a) said fly ash is reacted with aqueous $H_3PO_4$ having a concentration of 40% $H_3PO_4$ or greater by weight.

5. The process of claims 1, 2, or 3 in which in step (b) said NaOH is present in excess of the stoichiometric amount required to convert all of said $AlPO_4$ from step (a) to $Na_3AlO_3$, said second reaction mixture after said NaOH reaction having a pH above 12.0.

6. The process of claims 1, 2, or 3 in which before carrying out step (d) hydrogen and fluoride ions are initially added to reduce the pH to around 11 with the formation of a first precipitate substantially free of cryolite, separating said first precipitate from the residual solution, and thereafter adding additional hydrogen and fluoride ions to form said cryolite precipitate for separation in step (e).

7. The process of claims 1, 2, or 3 in which at least part of said cryolite precipitate as formed in step (d) is separated in step (e) at a pH of about 7.0 to 7.2.

8. The process of preparing cryolite ($Na_3AlF_6$) from coal fly ash containing $Al_2O_3$, $Fe_2O_3$, CaO, and $SiO_2$ as principal constituents, comprising:

(a) reacting aqueous phosphoric acid ($H_3PO_4$) with said fly ash, at least 12% by weight of said fly ash being $Al_2O_3$ and the amount of said CaO being less than 6% by weight, said $H_3PO_4$ containing not over 30% water by weight and being employed in a molar ratio of 0.6 to 2.0 moles of $H_3PO_4$ per Fly Ash Acidification Mole (FAA Mole), said FAA Mole being computed as 2 times the total moles of Al$_2$O$_3$ and Fe$_2$O$_3$ in the amount of fly ash used plus 0.67 times the moles of CaO therein, thereby converting the Al$_2$O$_3$ to aluminum phosphate (AlPO$_4$);

(b) adding aqueous sodium hydroxide (NaOH) to convert said AlPO$_4$ to sodium aluminate (Na$_3$AlO$_3$), the resulting reaction mixture containing solids and having a pH of above 12.0;

(c) separating the solids from said reaction mixture to obtain a solution containing said Na$_3$AlO$_3$ at a pH above 12.0;

(d) adding hydrogen ions (H$^+$) and fluoride ions (F$^-$) to said Na$_3$AlO$_3$ containing solution to reduce the pH to below 8.5 with the formation of cryolite; and (e) separating the precipitated cryolite from the residual solution.

9. The process of claim 8 in which said hydrogen and fluoride ions are added as aqueous hydrofluoric acid (HF).

10. The process of claim 8 in which said hydrogen and fluoride ions are added as aqueous hydrochloric acid (HCl) and sodium fluoride (NaF).

* * * * *